United States Patent Office 3,755,570
Patented Aug. 28, 1973

3,755,570
CONTROL OF PESTS WITH S-2-HYDROCARBYL-THIOALKYL ESTERS OF THIOPHOSPHORUS ACIDS
Wolfgang H. Mueller, Elizabeth, Warren A. Thaler, Matawan, and Alexis A. Oswald, Mountainside, N.J., assignors to Esso Research and Engineering Company
No Drawing. Original application Mar. 4, 1969, Ser. No. 805,115, now Patent No. 3,660,542. Divided and this application Feb. 10, 1972, Ser. No. 225,359
Int. Cl. A01n 9/36
U.S. Cl. 424—216                                 13 Claims

ABSTRACT OF THE DISCLOSURE

Neutral S-2-hydrocarbylthioalkyl esters of thiophosphorus acids possess particularly good pesticidal activity against insects, mites and nematodes.

This is a division of application Ser. No. 805,115, filed on Mar. 4, 1969, now U.S. Pat. No. 3,660,542.

BACKGROUND OF THE INVENTION (I) Field of the invention

This invention pertains to neutral, primary S-2-hydrocarbylthioalkyl esters of thiophosphorus acids. More particularly, this invention relates to S-2-alkyl-2-alkylthioethyl esters of dialkyl dithio- and monothiophosphoric acids, aliphatic dithiophosphonic and dithiophosphinic acid salts and to a method for their formation.

(II) Description of the prior art

Esters of thiophosphorus acids are known as useful pesticides. Many of these esters have been produced by displacement reactions starting with thiophosphorus acid salts. G. Schrader described in "Die Entwicklung neuer insektizider Phosphorsäure-Ester" that, for example, 2-alkylthioalkyl esters of thiophosphorus acids can be produced by reacting the 2-alkylthioalkyl chloride with the salt of the corresponding thiophosphorus acid (see pages 338 to 427 of the above book published by Verlag Chemie, Weinheim/Bergstr., W. Germany (1963)). The reaction scheme most closely related to the process of this invention is described in U.S. Pat. 2,952,700.

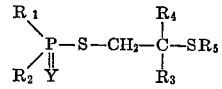

(I)

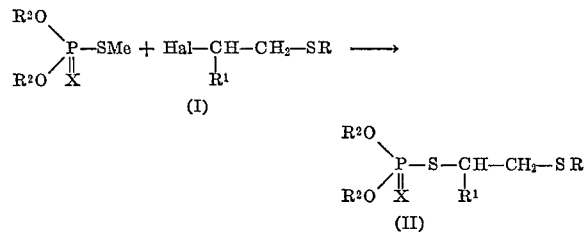

wherein R, $R^1$ and $R^2$ denote alkyl groups, Me is metal and X is a sulfur or oxygen atom. As was expected, it was reported that the reaction of a secondary 2-alkylthioalkyl chloride (I) with the thiophosphate salt produces the secondary thiophosphate ester (II).

In contrast, it has been found that the reaction of a mixture of the secondary and the primary 2-alkylthioalkyl chlorides (I and III) yields the primary thiophosphate ester (IV):

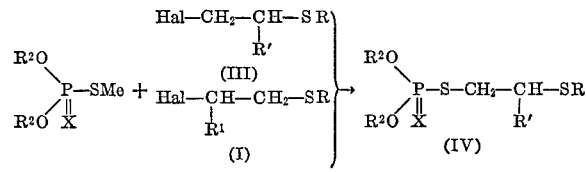

This surprising finding was of interest since the primary esters of Type IV are superior pesticides to the secondary esters of Type II.

SUMMARY OF THE INVENTION

In accordance with the present invention it has been found that neutral, primary S-2-hydrocarbyl-2-hydrocarbylthioethyl esters of thiophosphorus acids, said esters having the general formula $$\begin{array}{c} R_1 \quad\quad R_4 \\ \diagdown \quad\quad | \\ P{-}S{-}CH_2{-}C{-}SR_5 \\ \diagup \| \quad\quad | \\ R_2 \;\; Y \quad\quad R_3 \end{array}$$

can be prepared through displacement reactions involving halide displacement by a thiophosphorus acid salt either on a 2-hydrocarbyl-2-hydrocarbylthioethyl halide alone or on an isomeric halide mixture consisting of a major proportion of the above halide and a minor proportion of 1-hydrocarbyl-2-hydrocarbylthioethyl halide. The displacement reaction leads to large yields, at high selectivity, of the desired primary ester of thiophosphorus acid. The reaction product contains at least about 80 mole percent, normally 90–98 mole percent of the desired primary ester rather than the secondary or tertiary products.

The displacement reactions are conventionally carried out in the liquid phase at moderate temperatures and atmospheric pressure in the presence of a polar diluent. The desired primary esters of thiophosphorus acids are highly effective pesticides and also find use as animal health agents.

The above described reactions are illustrated in more detail by the following reaction schemes:

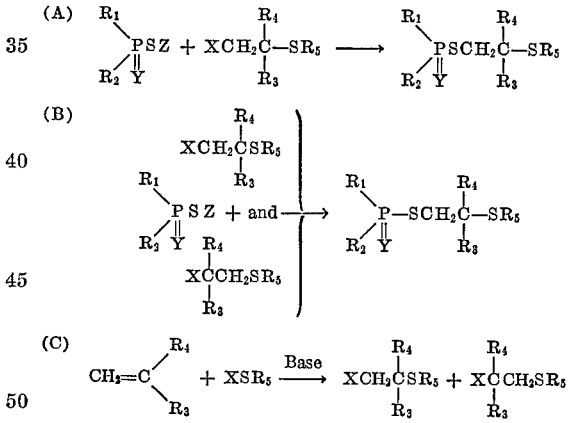

Scheme A illustrates the reaction of a thiophosphorus acid salt with a 2-hydrocarbyl-2-hydrocarbylthioethyl halide yielding the corresponding primary ester of the thiophosphorus acid. Scheme B shows the identical reaction with the exception that an isomeric mixture of 2-hydrocarbyl-2-hydrocarbylthioethyl halide and a 1-hydrocarbyl-2-hydrocarbylthioethyl halide is used as the starting aliphatic reagent.

As is demonstrated in Scheme C, the starting aliphatic halide can be conveniently prepared by the addition of hydrocarbon sulfenyl halides to unsymmetrical olefins. Suitable halide reagents for the displacement reactions of the present process are prepared according to the addition process described in copending application Ser. No. 595,-559 filed Oct. 28, 1966, now abandoned, the disclosure of which is herein incorporated by reference.

Briefly, the 2-hydrocarbyl-2-hydrocarbylthioethyl halides are secured by reacting monoolefins or non-conjugated diolefins and multiolefins with sulfenyl halides, preferably sulfenyl chlorides, in the presence of a non-reactive organic or inorganic base at a temperature below 0° C.

The reaction is conducted in the liquid phase under sufficient pressure to maintain at least a portion of the process reagents in the liquid form. Alkali and alkaline earth metal carbonates and oxides, tertiary amines and pyridine are useful base materials. The halide material thus formed will contain the primary halide as the major isomeric product.

The present process uses with surprising advantage an isomeric adduct mixture containing a major (greater than 50 mole percent) amount of primary halide. The exact amount of the primary halide adduct is dependent on the structure of the adding reagents. If both $R_3$ and $R_4$ groups of the olefin reagent are alkyl groups, the adduct will have a primary halide content of 90 mole percent or higher. If $R_4$ is hydrogen and $R_3$ is alkyl, the primary halide content will be lower but still above 60%. The $R_5$ substituent of the sulfenyl chloride reagent also has an influence on the structure of the resulting adduct. An addition wherein a less substituted aliphatic sulfenyl chloride (wherein $R_5$ is alkyl) is used results in yields of more than 70 mole percent primary halide while the use of aromatic sulfenyl halides (where $R_5$ is an aryl radical) results in primary sulfenyl halide contents down to 60 mole percent of the total product. Typically, the reaction of a normal alpha olefin with an aliphatic sulfenyl chloride according to Scheme C leads to the formation of isomeric product mixtures contain only 5 to 20 mole percent of the secondary halide, i.e. 1-alkyl-2-alkylthioethyl chloride, and 80 to 95 mole percent of the primary halide derivative, i.e. 2-alkyl-2-alkylthioethyl chloride.

It is important to note, as is shown in Scheme B, that the reaction using an isomeric mixture of 2-haloalkyl sulfides as a starting material leads to a product composed predominantly (greater than 50 mole percent) of the desired primary esters of thiophosphorus acids.

As shown by Schemes A and B, the first reagent employed in the displacement process is a thiophosphorus acid salt of the general formula:

In the above formula Y is a sulfur or oxygen atom; Z designates a mono-, di-, or trivalent, preferably a monovalent, metal cation or an ammonium cation and $R_1$ and $R_2$ denote a $C_1$ to $C_{30}$ monovalent organic radical, preferably an unsubstituted or substituted hydrocarbyloxy, hydrocarbylthio or hydrocarbyl group.

The Z cation of the above salts is preferably a monovalent or divalent metal cation. It is most preferably a monovalent alkali metal such as sodium or potassium. When divalent metals, e.g., calcium are used, the salt will have two thiophosphorus acid residues per metal atom. The symbol Z may also designate an ammonium ion which may be either nonsubstituted or partially or fully substituted. The ammonium ion can be depicted by the following general formula:

$$(H)_nN(R)_m$$

wherein R is a $C_1$ to $C_7$ hydrocarbyl radical, $n$ and $m$ range from 0 to 4 and $n+m$ equals 4. The ammonium salt of thiophosphorus acid may also exist as a hydrogen bonded complex if $n$ is 1 or greater than 1. In the present system it is preferable to employ the nonsubstituted ammonium salt derived by the addition of ammonia to the respective thiophosphorus acid.

As noted earlier, $R_1$ and $R_2$ designate $C_1$ to $C_{30}$ monovalent monosubstituted and unsubstituted organic radicals, however, $R_1$ and $R_2$ are more preferably organic radicals having $C_1$ to $C_8$ carbon atoms and most preferably radicals having $C_1$ to $C_4$ carbon atoms. The organic radicals are preferably $C_1$ to $C_{30}$, more particularly $C_1$ to $C_8$ hydrocarbyloxy, hydrocarbylthio, or hydrocarbyl radicals, and most preferably are $C_1$ to $C_4$ alkoxy alkylthio or alkyl groups. $R_1$ and $R_2$ may be the same or different organic moiety. If $R_1$ and $R_2$ are identical it is preferable that either they be a methoxy or ethoxy radical. If $R_1$ and $R_2$ are different it is preferable that $R_1$ be a methoxy or ethoxy radical and $R_2$ be a methyl, ethyl, or $C_1$ to $C_4$ alkylthio radical.

The hydrocarbyloxy, hydrocarbylthio and hydrocarbyl radicals can be substituted or unsubstituted. Monosubstitution is preferred. Suitable substituents include hydrocarbylthio radicals preferably $C_1$ to $C_4$ alkylthio radicals and hydrocarbyloxy radicals preferably $C_1$ to $C_4$ hydrocarbyloxy radicals.

Typical examples of $R_1$ and $R_2$ radicals include: cetyloxy, hexadecylphenylthio, naphthyloxy, methyloxy, ethylthio, propylthio, methyl, hydroxymethyl, propyloxymethyl, chlorovinyl, propargylthio, crotylthio, phenyl, phenylthio, xylyl, benzylthio, chlorophenylethylthio, butylthio, ethoxy, ethyl, etc. Preferred types of ammonium, sodium and potassium thiophosphorus acid salt reagents are shown by the following formulae:

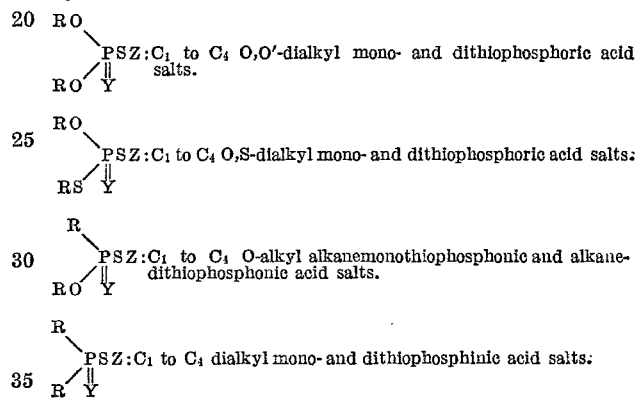

wherein R is a monovalent $C_1$ to $C_4$ alkyl group, Y is a sulfur or oxygen atom and Z is an $NF_4$, Na or K cation.

Examples of useful salts of thiophosphorus acids include sodium dimethyl dithiophosphate, ammonium diethyl dithiophosphate, dicetyl dithiophosphoric acid potassium, dioctyl dithiophosphoric acid lithium, diphenyl dithiophosphoric acid potassium, trimethylammonium didodecylphenyl dithiophosphate, O-ethyl-S-propyl dithiophosphoric acid sodium, O-methyl-S-butyl dithiophosphoric acid ammonium salt, O-ethyl-S-ethyl dithiophosphoric acid triethylenediamine salt, O-ethyl ethanedithiophosphoric acid sodium, O-methyl methanedithiophosphoric acid potassium, O-ethyloxy propyloxymethanedithiophosphoric acid sodium, ammonium O-ethyl benzene-dithiophosphonate, O-ethyl methylthioethenedithiophosphonate. O-ethyl hydroxyethanethiophosphonic acid sodium, O-ethyl methylsulfonylmethanedithiophosphonic acid sodium, dimethyl dithiophosphinic acid sodium, diphenyl dithiophosphinic acid sodium, dichlorovinyl dithiophosphinic acid sodium, dipropargylthiophosphinic acid potassium, etc.

The second reagent used in the reaction is a β-hydrocarbylthioalkyl halide wherein the primary halide isomer is the only or the major component. The primary isomer has the structure:

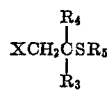

although it is understood that the corresponding isomeric secondary or tertiary halides may be present in the reactant mixture as minor constituents.

In the formula, X designates a halogen atom preferably a chlorine and bromine atom, most preferably a chlorine atom. The symbol $R_5$ represents a wide range of monovalent organic moieties having from 1 to 30 carbon atoms, preferably an unsubstituted or monosubstituted hydrocarbyl radical having from 1 to 8 carbon atoms. The symbol $R_3$ represents a $C_1$ to $C_8$, preferably $C_1$ to $C_4$, unsubstituted or monosubstituted alkyl radical and $R_4$ is a hydrogen radical or a $C_1$ to $C_8$, preferably $C_1$ to $C_4$ alkyl radical. Most preferably $R_3$ and $R_5$ are methyl or ethyl radicals and $R_4$ is a hydrogen or methyl radical.

Examples of useful β-alkylthioalkyl halides include: β-ethylthiopropyl chloride, β-methylthiocetyl bromide, β-phenylthiododecyl iodide, β - methylsulfonylphenylthiopropyl chloride, β-methylthiobutyl chloride, β-methylthio-1-butyl chloride, β-ethylthio-β-isopropyl-ethyl chloride, β-methylthiophenylthiobutyl chloride, β-ethylthio-β-benzyl-ethyl chloride, β-chloro phenylthio-β-t-butyl ethyl chloride, β - cyanoethylthiohexyl chloride, β - methylthioethylthiopropyl chloride, β-methylsulfonylpropylthiobutyl chloride, β-trifluoromethylthiopropyl chloride, β-methylthio-β-ethyl butyl chloride, β-phenylthio-bis-β-benzyl-ethyl chloride, β-methylthio-β-cyanoethyl-propyl chloride, β-benzothiazyl-thiopropyl chloride, β - furfurylthiopropyl chloride, β-thienylthiopropyl chloride, etc.

In view of the ionic nature of the present process, it is desirable to employ a suitable solvent. Polar solvents are generally preferred. Solvent use is advantageous in helping to reduce the viscosity of the reaction medium and diminish the relative amount of solids in the reaction mixture. Usually 0.2 to 20 volumes preferably 0.5 to 5 volumes of a non-reactive solvent is used per volume of process reagents. Useful solvents include nitriles, alcohols, ketones, ethers, esters, amides, chlorinated hydrocarbons, aromatic hydrocarbons, water, etc. Examples of preferred organic solvents are ethanol, acetone, acetonitrile, ethyl sulfide, ethylacetate, dimethylformamide, chloroform, benzene. Water may be used alone or, preferably, in admixture with other solvents.

The displacement reaction proceeds well in the absence of any catalyst. Typically the reaction is conducted with approximately equimolar amounts of the two reactants being present within the reaction zone. An excess of the thiophosphorus acid salt may be used to facilitate the conversion of all the halide. Alternatively, an excess of the isomeric mixture of the halide reagent may be used thereby converting only the primary halide and permitting the recovery of the secondary or tertiary halides. Preferably, the molar ratio of thiophosphorus acid salt to β-hydrocarbylthioalkyl halide within the reaction zone varies from 2:1 to 1:3. However, the ratio is most preferably maintained betwen 1.2:1 and 1:2.

Instead of introducing the actual thiophosphorus acid salt reagent into the reaction zone, the corresponding base and the free thiophosphorus acid can be used. For example, instead of using the pyridinium salt, pyridine and the free acid can be employed. In such a case, pyridine is first added to the hydrocarbylthioalkyl halide followed by the free acid. Instead of a relatively strong free base, a slightly basic acid acceptor such as dimethyl formamide can be used. Such an acceptor can also serve as a solvent and as such can be used in a large excess.

The reaction is conventionally conducted in the liquid phase at temperatures ranging from about −50 to 150° C., preferably at temperatures varying from −10 to 100° C. and most preferably between 20 and 80° C. The higher limit of the reaction temperature range is usually set by the temperature at which undesired isomerization of the primary halide reagent to the secondary or tertiary halide occurs or the temperature at which thermal decomposition of the salt reagent commences.

In general, the reaction is conducted at atmospheric pressure. When volatile reactants and/or solvents are used, the use of higher reaction temperatures can necessitate the use of super-atmospheric pressures to maintain the mixture in the liquid phase. Reaction zone pressures can vary from atmospheric to super-atmospheric. Pressures up to 10 atmospheres can be used.

The displacement reactions proceed well with the above described reactants within the specified temperature and pressure limits. The reactions reach substantial completion and yield the desired product in excess of 50% of the theoretical amount within 0.5 to 100 hours, preferably within 0.5 to 24 hours. The use of extended reaction times and low temperatures, while convenient in the laboratory, can be preferably replaced with a combination of shorter periods and higher temperatures in commercial production.

New products were prepared with the displacement reactions that were hitherto unknown and unavailable. The general formula of the new compositions is:

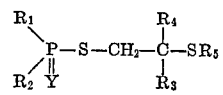

wherein Y, $R_1$, $R_2$, $R_3$ and $R_5$ are as previously described and $R_4$ is a $C_1$ to $C_8$ alkyl radical, preferably $C_1$ to $C_4$ alkyl radical, most preferably a methyl radical. Examples of the compositions covered by the above general formula include O,O'-dicetyl-S-2-benzoxazylthio-2-benzyloctyl dithiophosphate, O,O'-dinonylphenyl-S-2-butoxyethylthio-2-ethylhexyl thiophosphate, O,O'-dichlorophenyl-S-2-dodecylthio-2-cyanomethylpropyl thiophosphate, and O-phenyl-O'-benzyl S-2-naphthylthiomethylthiomethylpropyl dithiophosphate.

The thiophosphorus ester products of the reaction are useful as pesticides and animal health agents. The present products are particularly attractive as insecticides, miticides and nematocides. For insecticidal and miticidal application, it is important to note that these esters have systemic properties, i.e. they are taken up by and transported through the plant sap. The products are also useful for the control of soil insects and nematodes.

Depending on the particular pesticidal use, the products can be used as the active components of liquid, emulsified sprays in a concentration of 0.001 to 1%. They can be also used in highly concentrated solutions containing from 50 to 100% of the active product. Solid formulations, i.e. pesticide dusts, can contain from 0.5 to 20% of the esters.

Some of the new compositions are particularly useful for the control of plant and animal pests. These compositions have the general formula:

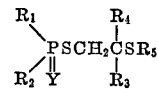

wherein Y is oxygen or sulfur atom; $R_1$ and $R_2$ are $C_1$ to $C_8$ hydrocarbyloxy groups or $C_1$ to $C_8$ monosubstituted hydrocarbyloxy groups, preferably $C_1$ to $C_2$ alkoxy groups; $R_5$ is a $C_1$ to $C_8$ organic radical, preferably a $C_1$ to $C_8$ hydrocarbyl radical or a $C_1$ to $C_8$ substituted hydrocarbyl radical, most preferably a $C_1$ to $C_2$ alkyl radical; $R_3$ and $R_4$ are $C_1$ to $C_8$ alkyl radicals or $C_1$ to $C_8$ monosubstituted alkyl radicals. $R_3$ and $R_4$ are preferably $C_1$ to $C_4$ alkyl radicals; most preferably $C_1$ to $C_2$ alkyl radicals.

Examples of the preferred pesticidal compositions include O,O'-dimethyl-S-2-ethylthio-2-ethylbutyl dithiophosphate; O,O'-diethyl-S-2-chlorophenylthio - 2 - methylbutyl thiophosphate; O-methyl-O'-ethyl-S-2-benzothiazylthio-2-methylpropyl dithiophosphate; O,O' - diethyl-S-2-thienylthio-2-methylphenylpropyl thiophosphate, O,O'-diethyl-S-2-furfurylthio-2-benzylhexyl thiophosphate, etc.

Water is commonly employed alone or in combination with emulsifiers, alcohols, ketones and liquid hydrocarbons as a liquid carrier for the pesticide products. A solution of the esters in organic solvents may also be used. Solid materials such as talc, chalk, bentonite and clay may be employed as solid carriers. Animal pests are normally controlled with the use of spray formulations. Animal pests particularly sucking insects can also be controlled by internally administering the systemic ester compositions to the animals.

DESCRIPTION OF THE PREFERRED EMBODIMENTS

The following embodiments are submitted to more particularly point out the invention.

Example 1

A suspension of 8.05 grams (0.043 mole) of ammonium O,O'-diethyl thiophosphate contained in 35 milliliters of acetonitrile was admixed with 4.55 grams (0.0366 mole) of an isomeric mixture composed of 81 mole percent of 2-methylthiopropyl chloride and 19 mole percent of 1-methylthiopropyl chloride. The suspension was stirred for 24 hours at ambient temperature (about 20° C.) and then stirring was continued for an additional 3 hours at about 55° C.

Upon completion of the reaction period, the total mixture was cooled and filtered. The acetonitrile was removed from the crude liquid fraction using a rotary evaporator and the resulting liquid product dissolved in 100 milliliters of ether, filtered, washed twice with water, dried over sodium sulfate and the ether removed using a rotary evaporator operatel under vacuum conditions. Remaining traces of volatile impurities were removed by bubbling nitrogen through the liquid product at 45° C. and 1.5 millimeter of mercury pressure for 2 hours. Gas chromatographic analysis of the product (8.32 grams, 86.5% yield) indicated that the product contained about 91 mole percent of the desired O,O'-diethyl-S-2-methylthio-2-methylpropyl thiophosphate. The identity of the product was confirmed by comparing its nuclear magnetic resonance (NMR) spectrum and gas-liquid chromatographic (GLC) retention time with that of a known sample.

Example 2

A suspension of 7.2 grams (about 0.04 mole) of ammonium O,O'-diethyl thiophosphate in 35 milliliters of acetonitrile and 3.3 grams (about 0.27 mole) of 2-methylthiopropyl chloride containing 13 mole percent of the secondary chloride isomer was stirred for 24 hours and then heated for 6 additional hours at 65° C.

Workup of the reaction mixture in the manner described in Example 1 afforded 6.5 grams (a yield of 89%) of the product. Analysis of the product by NMR and GLC showed that it contained 82% of the desired primary ester, i.e. O,O'-diethyl - S - 2 - methylthio-2-methylpropyl thiophosphate. About 12% of the product had the isomeric secondary ester structure. The rest of the product, i.e. 6% was mainly O,O'-S-triethyl thiophosphate.

Example 3

A solution of 8 grams (0.05 mole) of ammonium O,O'-dimethylthiophosphate contained in 10 milliliters of dry methanol and 6.25 grams (0.05 mole) of an isomeric mixture composed of 81 mole percent of 2-methylthiopropyl chloride and 19 mole percent of its secondary chloride isomer was stirred at ambient temperature for about 48 hours. Thereafter, the methanol solvent was removed using a rotary evaporator. The crude product was taken up in ether, filtered, washed with water and dried over magnesium sulfate. After the ether removal, 7 grams (approximately 60% yield) of product were recovered. This product boiled at a temperature varying between 102 and 103° C. at 0.5 millimeter of mercury pressure. GLC and NMR analysis indicated that the product was composed of about 85 mole percent of the desired O,O'-dimethyl-S-2-methylthio-2-methylpropyl thiophosphate.

Analysis.—Calcd. for $C_5H_{15}O_3PS_2$ (percent): C, 31.29; H, 6.87; S, 27.85. Found (percent): C, 30.46; H, 6.56; S, 28.21.

Example 4

A suspension of 9.80 grams (0.0524 mole) of ammonium O,O'-diethylthiophosphate, 5.38 grams (0.040 mole) of an isomeric mixture containing 80 mole percent of 2-methylthio-2-methylpropyl chloride and 20 mole percent of its corresponding isomer and 0.1 gram of calcium carbonate contained in 10 milliliters of acetonitrile was stirred for 5 hours at 60° C. GLC analysis of the crude product showed that none of the organo chloride starting material remained and that a single product was formed. The product from the reaction was taken up in 100 milliliters of ether, washed with water, and then dried over sodium sulfate. The crude product was then placed within a rotary evaporator to remove the acetonitrile solvent. Thereafter, the crude product was placed in a round bottom flask and heated to a temperature of 60° C. at 0.05 millimeter of mercury pressure to remove trace impurities. The residual material recovered from the distillation apparatus (7.62 grams, 70% yield) was composed of about 98 mole percent of O,O'-diethyl-S-2-methylthio-2-methylpropyl thiophosphate.

Analysis.—Calcd. for $C_9H_{21}PS_2O_3$ (percent): C, 39.66; H, 7.77; S, 23.55. Found (percent): C, 40.25; H, 7.68; S, 23.44.

Example 5

A suspension of 10.2 grams (0.05 mole) of ammonium O,O'-diethyldithiophosphate, 5.38 grams (0.04 mole) of an isomeric mixture composed of 80 mole percent of 2-methylthio-2-methylpropyl chloride and 20 mole percent of its secondary chloride and 0.1 gram of calcium carbonate contained in 10 milliliters of acetonitrile was stirred at 50° C. for 5 hours. GLC analysis indicated a complete reaction. The product mixture was worked up following the procedure of Example 3 and 9.22 grams (80% yield) of product were recovered. The product upon NMR analysis was found to contain 98 mole percent of O, O'-diethyl-S-2-methylthio-2-methylpropyl dithiophosphate.

Analysis.—Calcd. for $C_9H_{21}PS_3O_2$ (percent): C, 37.45; H, 7.34; S, 33.36. Found (percent): C, 37.29; H, 7.29; S, 33.53.

Example 6

A suspension of 7.16 grams (0.01 mole) of ammonium O,O'-dimethylthiophosphate, 0.1 gram of calcium carbonate, 5.5 grams (0.41 mole) of an isomeric mixture consisting of 80 mole percent of 2-methylthio-2-methylpropyl chloride and 20 mole percent of 1-methylthio-1-methylpropyl chloride contained in 10 milliliters of acetonitrile was reacted following the general procedure described in Example 4. The usual product recovery technique (as practiced in the previous examples) served to isolate 5.7 grams of a product which was found to contain, by NMR spectroscopy, about 84 mole percent of O,O'-dimethyl-S-2-methylthio - 2 - methylpropylthiophosphate, 2 mole percent of the isomeric secondary ester and 14 mole percent of O,O'-S'-trimethyl thiophosphate.

Example 7

Ammonium O,O' - dimethyl dithiophosphate and 2-methylthiopropyl chloride is reacted in the manner described in Example 6 to provide O,O'-dimethyl-S-2-methylthiopropyl dithiophosphate as the major product.

Example 8

Following the general procedure of Example 3, an equimolar mixture of 2-heptylthio-2-isobutyloctyl bromide and sodium, O,O'-dibutyldithiophosphate is reacted at 50° C. for 6 hours at atmospheric pressure. The product recovered is predominantly O,O'-dibutyl-S-2-heptylthio-2-isobutyloctyl dithiophosphate.

Example 9

An equimolar mixture of 2-benzylthio-2-pentyldodecyl bromide and potassium O,O'-dioctyl dithiophosphate contained in ethylene glycol is reacted at 45° C. for 10 hours. The product recovered is composed predominantly of O,O'-dioctyl-S-2 - benzylmercapto - 2 - pentyl dodecyl dithiophosphate.

Example 10

An equimolar mixture of 2-phenylthio-2-propylhexyl chloride and lithium O-pentyl, O'-phenyl dithiophosphate is reacted at room temperature for 8 hours in the presence of ethylene glycol solvent. The product from the reaction is composed primarily of O-pentyl-O'-phenyl-S-2-phenyl-thio-2-propylhexyldithiophosphate.

Example 11

One mole of O-ethyl-S-propyl dithiophosphoric acid ethylenediamine salt is reacted with two moles of 2-ethylthiopropyl chloride in acetonitrile to yield as the main product O-ethyl-S-propyl - S' - ethylthiopropyl dithiophosphate.

Example 12

An equimolar mixture of O-methyl ethanedithiophosphonic acid sodium and 2-methylthiopropyl chloride is reacted in acetone to yield mainly O-methyl S-2-methylthiopropyl ethanedithiophosphonate.

Example 13

An equimolar mixture of O-ethyl methylthiomethanethiophosphonic acid trimethylammonium salt and 2-p-chlorophenylthiobutyl chloride is reacted in benzene to yield O-ethyl S - 2 - p - chlorophenylthiobutyl thiophosphonate.

Example 14

An equimolar mixture of bis-2,4-dichlorophenyl dithiophosphinic acid potassium and 2-cetylthiopropyl bromide is reacted in chlorobenzene to yield 2-cetylthiopropyl bis-2,4-dichlorophenyl dithiophosphinate.

Example 15

An equimolar mixture of dimethyl thiophosphinic acid sodium and 2-benzothiazylthiopropyl chloride is reacted to yield S-2-benzothiazylthiopropyl dimethyl thiophosphinate.

Example 16

A series of tests were conducted to demonstrate the effectiveness of S-(2-hydrocarbylthio-2,2-dialkyl) - ethyl esters of thiophosphorus acids for agricultural applications. In each of the insecticidal and miticidal tests, the products of Examples 4 to 7 were dissolved in acetone and were dispersed in distilled water with a conventional alkyl aryl polyether alcohol (Triton X–100) to give spray emulsions of various concentrations. Each of these emulsions were then used in standard laboratory insecticidal and miticidal dilution tests described hereinafter.

In one test series adult pea aphids were sprayed and transferred to sprayed pea plants and held for 48 hour mortality determinations. Systemic insecticidal activity was evaluated by applying 20 milliliters of the sample as a spray to the vermiculite substratum of the potted pea plants. Forty-eight hours after application, the plants were infested with 10 adult pea aphids and mortality determination was made after 5 days.

In another test series, lima bean plants were infested with 50–100 adults of the strawberry spider mite, *Tetranychus atlanticus*, prior to testing. The infested plants were dipped into the test material and then held for 5 days. Adult mortality was then determined. The systemic tests were carried out in the manner described for aphids.

The results of the tests are shown in Table I below.

TABLE I.—O,O'-DIALKYL S-(2-METHYLTHIO-2,2-DIMETHYL)-ETHYL THIOPHOSPHATES AS APHICIDES AND MITICIDES

| Synthesis under Ex. No. | Structure of compound | Percent mortality produced by 0.01% pesticidal spray | | | |
|---|---|---|---|---|---|
| | | Pea aphids | | Mites | |
| | | Contact, 2 days | Systemic, 5 days | Contact, 2 days | Systemic, 5 days |
| 4 | $(C_2H_5O)_2\underset{\underset{O}{\parallel}}{P}SCH_2\underset{\underset{CH_3}{\vert}}{\overset{\overset{CH_3}{\vert}}{C}}SCH_3$ | 100 | 100 | 100 | 100 |
| 5 | $(C_2H_5O)_2\underset{\underset{S}{\parallel}}{P}SCH_2\underset{\underset{CH_3}{\vert}}{\overset{\overset{CH_3}{\vert}}{C}}SCH_3$ | 100 | 100 | 100 | 100 |
| 6 | $(CH_3O)_2\underset{\underset{O}{\parallel}}{P}SCH_2\underset{\underset{CH_3}{\vert}}{\overset{\overset{CH_3}{\vert}}{C}}SCH_3$ | 100 | 100 | 67 | 100 |
| 7 | $(CH_3O)_2\underset{\underset{S}{\parallel}}{P}SCH_2\underset{\underset{CH_3}{\vert}}{\overset{\overset{CH_3}{\vert}}{C}}SCH_3$ | 100 | 100 | 34 | 97 |

The results set forth in Table I clearly indicate that the compounds synthesized using the process of the present invention are effective pesticides.

Example 17

The product of Example 4 was investigated for its toxicity towards warm blooded animals. For the determination, adult male mice of the Swiss-Webster strain, 30–35 grams in weight, were used. They were given a single calculated dose of the product via stomach syringe and were observed for survival during a two-week period.

It was found that the mice which were given a dose of 100 milligrams per kilogram of body weight survived while those receiving a dose of 200 mg./kg. died. This means that the median lethal dose, $LD_{50}$ for this compound is between 100 and 299 mg./kg. In comparison it was found that a structurally closely related commercial compound, Systox, has an $LD_{50}$ between 1–10 mg./kg.

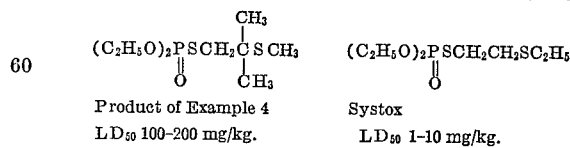

Product of Example 4

$LD_{50}$ 100-200 mg/kg.

Systox $LD_{50}$ 1-10 mg/kg.

What is claimed is:

1. A method for controlling pests selected from the group consisting of insects, mites and nematodes, comprising contacting said pests with a pesticidally effective amount of a compound of the formula

in which Y is sulfur or oxygen; each of $R_1$ and $R_2$ is $C_1$–$C_4$ alkoxy, $C_1$–$C_4$ alkylthio, or $C_1$–$C_4$ alkyl optionally substituted by $C_1$–$C_4$ monoalkoxy or $C_1$–$C_4$ monoalkylthio groups; each of $R_3$ and $R_4$ is $C_1$–$C_8$ alkyl; and $R_5$ is methyl or ethyl.

2. The method of claim 1 in which, in the compound, each of $R_1$, $R_2$, $R_3$ and $R_4$ is $C_1$–$C_4$ alkyl.

3. The method of claim 1 in which, in the compound, each of $R_3$ and $R_4$ is $C_1$–$C_4$ alkyl.

4. The method of claim 3, in which, in the compound, each of $R_1$ and $R_2$ is $C_1$–$C_4$ alkoxy or $C_1$–$C_4$ alkylthio.

5. The method of claim 3, in which, in the formula, $R_1$ is methoxy or ethoxy; $R_2$ is methoxy, ethoxy or $C_1$–$C_4$ alkylthio, and $R_3$ and $R_4$ are methyl.

6. The method of claim 5, in which, in the formula, $R_2$ is $C_1$–$C_4$ alkylthio.

7. The method of claim 5, in which, in the formula, $R_2$ is methoxy or ethoxy.

8. The method of claim 7, in which, in the formula $R_5$ is methyl.

9. The method of claim 8, in which the compound is O,O′-diethyl-S-2-methylthio-2-methylpropyldithiophosphate.

10. The method of claim 7, in which the compound is O,O′-dimethyl-S-2-methylthio-2-methylpropyldithiophosphate.

11. The method of claim 7, in which, in the compound, Y is oxygen.

12. The method of claim 11, in which the compound is O,O′-diethyl-S-2-methylthio-2-methylpropylthiophosphate.

13. The method of claim 11, in which the compound is O,O′-dimethyl-S-2-methylthio-2-methylpropylthiophosphate.

References Cited

UNITED STATES PATENTS

| | | | |
|---|---|---|---|
| 2,952,700 | 9/1960 | Lorenz et al. | 260—948 |
| 3,232,830 | 2/1966 | Shrader et al. | 260—948 X |

ALBERT T. MEYERS, Primary Examiner

F. E. WADDELL, Assistant Examiner